United States Patent Office 2,751,459
Patented June 19, 1956

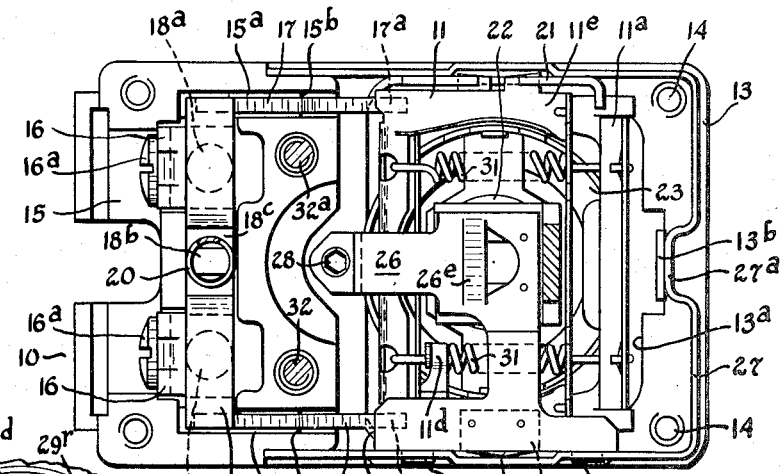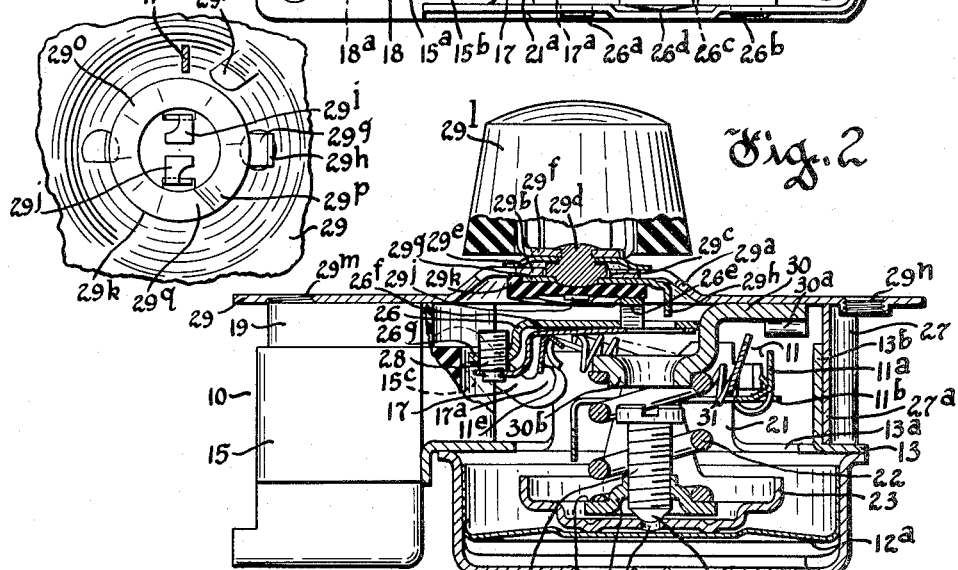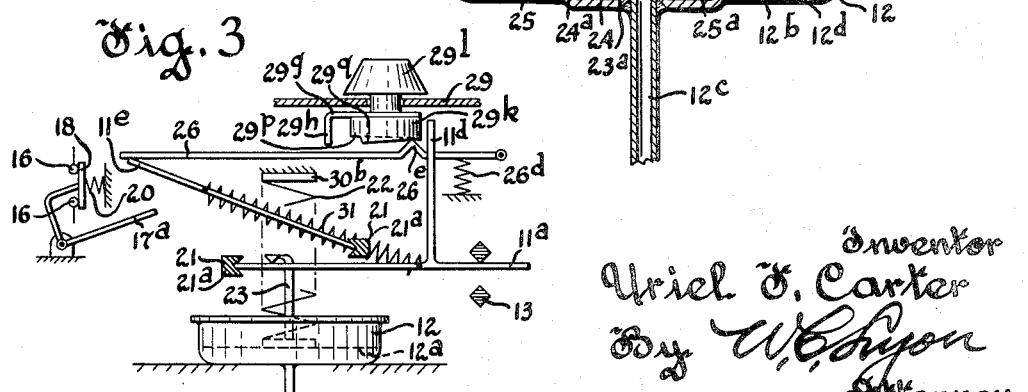

2,751,459

CIRCUIT CONTROLLING DEVICES

Uriel F. Carter, Wauwatosa, Wis., assignor to Cutler-Hammer, Inc., Milwaukee, Wis., a corporation of Delaware Application June 17, 1954, Serial No. 437,483

5 Claims. (Cl. 200—83)

This invention relates to improvements in circuit controlling devices, and more particularly to automatic temperature control switches of the "constant cut-in" type for use in connection with electric refrigerators.

A primary object of the invention is to improve and simplify the construction and operation of switches of the aforementioned character.

Another object is to provide for attainment of the desired result by a minimum number of changes in the structural details of a known commercial form of automatic temperature control switch of the "normal" type.

Other objects and advantages of the invention will hereinafter appear.

As is well known, "normal" refrigerator control devices operate with a fixed differential. That is to say, the pressure differential between the operating points of the control device is fixed. With such a control the temperature in the controlled space is varied by raising or lowering both the "cut-in" and the "cut-out" temperatures of the control.

In the "constant cut-in" control herein disclosed the "cut-in" temperature of the control device remains the same throughout the entire range of variation to control the temperature in the controlled space. This type of control is particularly useful in the food compartments of two zone refrigerators, and in beverage coolers, where it may be desirable to effect defrosting as an incident to each refrigeration cycle. In such refrigerators the warm temperature of the evaporator (namely, the "cut-in" temperature) is fixed; whereas means are provided for varying the coldest temperature to be provided by operation of the evaporator. In such an installation the median temperature in the controlled space is varied by varying the differential or spread between the "cut-in" and "cut-out" temperatures to be afforded by the control device.

The circuit controlling device herein disclosed is preferably in certain respects both structurally and functionally similar to that disclosed in the patent to Clyde F. Robbins, No. 2,375,387, granted May 8, 1945, and assigned to the same assignee as the present application. Said patent No. 2,375,387 discloses a type of control which is referred to above as a "normal control." The purpose of the control herein disclosed is to provide a "constant cut-in" feature, to insure defrosting after each cooling operation of the evaporator; and including an "off" switch. As will be noted, the cold control knob of the device herein disclosed has the same relative position with respect to the other switch parts as the control knob of the device of said patent No. 2,375,387; thus providing for alternative use of either device in a given installation, or replacement of either by the other.

The accompanying drawings illustrate a preferred embodiment of the invention which will now be described, it being understood that various modifications may be made in the embodiment illustrated without departing from the spirit and scope of the appended claims.

In the drawings,

Figure 1 is a top elevational view of a control device embodying the invention, with both the metal top plate of the device and the insulating top member of the switch removed, but with certain parts associated with the metal top plate shown in cross section.

Fig. 2 is a view, partly in vertical section and partly in side elevation, of the device shown in Fig. 1.

Fig. 3 is a diagrammatic illustration of the snap operating mechanism of the switch, with the parts thereof shown in circuit closing position; and Fig. 4 is a fragmentary bottom plan view of the cover member of the device, showing the molded insulating cam member and additionally illustrating the manner in which the same is connected to the coupling member for the operating knob of the device.

The refrigerator control device illustrated in the drawings includes a switch unit 10 and a unitary operating assembly therefor including a snap operating mechanism 11 and a pressure responsive device 12. The pressure responsive device 12 is attached to the lower surface of a rectangular base plate 13 by means of four screws preferably taking upwardly into tapped openings adjacent the respective corners of plate 13; the shank ends of two of said screws being shown at 14, 14 in Fig. 1.

As shown in Figs. 1 and 2 the switch unit 10 comprises a molded insulating base member 15, which is recessed as illustrated in Fig. 1 to accommodate a pair of combined contact and terminal members 16, 16; the horizontal portions of said members having suitable contact tips (not shown) attached to the upper surfaces thereof; and the vertical portions of said members having tapped openings formed therein to accommodate the shanks of a pair of wiring terminal screws $16^a$, $16^a$, respectively. Base member 15 is provided in its upper surface with a pair of like parallel recesses $15^a$, $15^a$ to respectively accommodate a pair of like symmetrical punched insulating actuating members 17, 17 of relatively wide inverted V-shape; said members having rounded upwardly projecting opposite end portions, as indicated at $17^a$ in Fig. 2. Each recess $15^a$ has its bottom wall shaped to provide a knife-edge pivot bearing $15^b$ for its respective member 17, and to provide clearance for pivotal movement of each of the latter, as indicated in dotted lines at $15^c$ in Fig. 2. The left-hand ends of the respective insulating actuating members 17 (Fig. 1) continuously underlie opposite ends of a contactor 18 which overlies the aforementioned stationary contact tips; contactor 18 preferably being provided on its lower surface with contact tips (shown in dotted lines at $18^a$, $18^a$) in alinement with said stationary contact tips.

Said switch unit 10 is also provided with a molded insulating top plate 19 (Fig. 2) which overlies the left-hand end portions and the points of pivotal support of members 17, to assist in retaining the latter in assembled position. As shown in Fig. 1, the left-hand ends of said members 17 respectively underlie opposite end portions of contactor 18. In practice I prefer to shape said opposite end portions of contactor 18 to downwardly facing concave form to accommodate or fit the rounded end portions $17^a$ of members 17. The lower surface (not shown) of cover member 19 is provided with an integral, relatively short, cylindrical boss to accommodate and position one end of a coiled compression spring 20, the other end of which spring (Fig. 1) is engaged with a centrally located boss $18^b$ formed in a centrally located depressed portion $18^c$ of contactor 18. When base 15 and cover member 19 are in assembled position, said spring 20 acts to normally bias contactor 18 into bridging engagement with the stationary contacts.

Cover member 19 is also preferably provided with an integral downward projection (not shown) the inner surface of which acts to retain the combined contact and terminal members 16 in assembled position with respect to base 15, while affording access to wiring terminal screws 16ᵃ to facilitate attachment of the circuit wires.

The snap operating mechanism 11 for switch 10 is mounted upon a pair of upstanding projections 21 and 21ᵃ (Fig. 1) of like form (as in the aforementioned Robbins Patent No. 2,375,387); the same being integral with and bent upwardly in parallel relationship to each other from base plate 13, thus assisting in providing a relatively large substantially rectangular opening 13ᵃ (Figs. 1 and 2) in base plate 13 to afford clearance for the loading spring 22 and a one-piece combined cup and yoke member 23.

As shown in Fig. 2, the pressure responsive device 12 includes a flexible metal diaphragm 12ᵃ which is sealed within the opening in a rigid metal cup member 12ᵇ having a closed tube 12ᶜ connected thereto. Diaphragm 12ᵃ is spaced from the bottom wall of cup member 12ᵇ to provide a sealed chamber 12ᵈ, and said chamber and the tube 12ᶜ are filled with a thermally responsive fluid, such as methyl chloride. The open end of cup member 12ᵇ is provided with four corner flange portions, and said cup member is secured to the under side of base plate 13 by four screws, which preferably take unto threaded openings in said flange portions, as aforementioned.

The aforementioned loading spring 22 is preferably of uniform coil diameter with flat ground lower and upper ends, as shown. The lower end of spring 22 is adapted to seat against, and be centered by, the upper surface of a downwardly offset circular flange 24ᵃ of a specially formed nut 24, which is threadedly engaged by a kerfed-head screw 25, which has a reduced or dome-shaped lower end portion 25ᵃ which fits into a relatively small opening 23ᵃ located centrally of the bottom wall of the cup portion of said combined cup and yoke member 23 to assist in centering the latter. Nut 24 is provided with oppositely extending arms (not shown) for cooperation with slots formed in the arms of member 23.

As will be understood from the above description, the screw 25 is factory adjusted to afford the desired pressure effect of loading spring 22 in opposition to the action of diaphragm 12ᵃ of pressure responsive device 12; and a fixed support is provided for the upper end of loading spring 22. In this manner the pressure of loading spring 22 against the diaphragm 12ᵃ is fixed, and one end of the upper or control lever 11ᵉ (Fig. 1) of the snap action mechanism 11 is controlled by the contact open stop. That is to say, by engagement of the left-hand end of control lever 11ᵉ with the right-hand ends 17ᵃ, 17ᵃ of levers 17, 17. At such time the left-hand ends of levers 17, 17 (see Fig. 1) will hold contactor 18 in its open position against the overlying portion of insulating cover member 19. These two fixed factors provide for a fixed pressure for operation of the control to the contact closed position. This is the "constant cut-in" feature.

To provide for adjustment of the "cut-out" or cold point of the control device another lever 26 is included in the mechanism. As illustrated in Fig. 1 lever 26 is provided with a pair of spaced, upwardly curved integral pivot lugs 26ᵃ and 26ᵇ which are inserted outwardly through relatively narrow openings located adjacent the upper edge of the intermediate substantially U-shaped housing member 27 (Figs. 1 and 2). Secured to the lower surface of lever 26 between the pivot lugs 26ᵃ and 26ᵇ, as by spot welding, is a thin plate of spring metal, as indicated in dotted lines at 26ᶜ in Fig. 1; said plate having a downwardly angled integral projection 26ᵈ, preferably of triangular contour, which engages the inner surface of housing member 27, to thereby normally bias lever 26 upwardly. Lever 26 is provided with an integral cam follower portion 26ᵉ which is partially sheared therefrom along parallel lines, and then bent or bowed upwardly from the plane of lever 26, as shown (Figs. 1, 2 and 3). Also secured to the lower surface of lever 26, as by spot welding, is another thin plate 26ᶠ (Fig. 2) of spring metal. The downwardly offset portion 26ᵍ of lever 26 is provided with a tapped opening to receive a screw 28, the upper end of which was a polygonal recess therein for adjustment thereof by a suitable wrench. The lower end of screw 28 is of reduced cylindrical form to fit within an opening in the correspondingly offset end portion of said resilient metal plate 26ᶠ. Screw 28 is factory adjusted to provide through the medium of said plate 26ᶠ, the desired resilient stop or abutment for the left-hand end of the operating lever 11ᵉ to limit upward movement of the latter when in contact-closed position.

Said intermediate housing member 27 is rigidly and permanently secured to base plate 13, preferably by spot-welding the inwardly offset end portion 27ᵃ of the former to the integral upwardly bent portion 13ᵇ of the latter, and by spot-welding each of the opposite side portions of member 27 at a plurality of points to the respective upstanding projections 21 and 21ᵃ on said base plate 13 (Figs. 1 and 2).

The housing includes a punched and stamped sheet metal top plate 29, which is shown as provided with a centrally located circular bulge or boss 29ᵃ, the flat upper end 29ᵇ of which (Fig. 2) is provided with a circular opening 29ᶜ to receive and permit rotation of a hub member 29ᵈ, which is preferably formed of stainless steel. The reduced upper end portion of hub member 29ᵈ is adapted to freely accommodate an upwardly bowed or bulged torque washer 29ᵉ formed of metal; which torque washer is tack welded at a suitable point in the periphery thereof to the flat upper surface of boss 29ᵃ, whereby rotation of washer 29ᵉ is positively prevented. Said reduced upper end of hub member 29ᵈ is also adapted to penetrate an opening in the flat base portion of a resilient metal coupling member 29ᶠ, in a predetermined rotary relationship to the latter; and said hub and coupling member being then welded to each other to prevent relative movement therebetween. The reduced lower end portion of hub member 29ᵈ is also adapted to receive, in a predetermined rotary relationship thereto, a punched and stamped sheet metal drive lever 29ᵍ (Figs. 2, 3 and 4); which parts are then welded to insure against relative rotation therebetween. Said drive lever 29ᵍ includes a relatively narrow portion 29ʰ bent downwardly at a right angle thereto, for a purpose hereinafter set forth. Said drive lever 29ᵍ also includes a pair of spaced downwardly projecting integral lugs 29ⁱ and 29ʲ (see Figs. 2 and 4), which extend through properly located clearance openings in a molded insulating cam member 29ᵏ, and are bent over the lower surface of the latter to prevent both axial and rotary movement therebetween. Also, as shown in Fig. 2, cam member 29ᵏ is interlocked with drive lever 29ᵍ to prevent relative rotary movement therebetween. The manual control or selector knob 29ˡ is adapted to fit onto coupling member 29ᶠ in only one relative rotary position, so that said knob may be provided with suitable indicia for cooperation with a dial or the like, not shown.

Said top plate 29 has attached to its inner surface, as by spot welding, the opposite ends of the head portion of a substantially T-shaped, relatively thick, sheet metal member 30, one of the arms of which is designated by numeral 30ᵃ in Fig. 2. A substantially wider portion of the stem of T-shaped member 30 is bent downwardly and horizontally to provide the substantially square portion 30ᵇ, which is perforated and formed as illustrated to afford a centering abutment for the upper end of loading spring 22.

Top plate 29 is provided adjacent opposite ends thereof with tapped openings to accommodate the shanks of suitable mounting screws for the device as a whole; said openings being shown at 29ᵐ and 29ⁿ in Fig. 2. Top plate 29 is provided adjacent the right-hand end thereof with downwardly offset hook portions (not shown) which enter suitably located rectangular openings (not shown) in the end wall of housing member 27. With the various parts of the device assembled as shown in Fig. 2, a pair of screws 32 and 32$^a$ (Fig. 1) are inserted downwardly through alined openings formed in top plate 29 and in the insulating cover 19 and body 15 of switch 10, and take into tapped openings (not shown) provided adjacent the left-hand end (Fig. 2) of base plate 13.

As shown in Fig. 1 the lower, or control, lever 11$^a$ of the snap action mechanism is provided adjacent the left-hand, or front, end thereof with an integral upstanding trigger lug designated by the numeral 11$^d$. Also it will be seen from Figs. 3 and 4 that the annular cam surface 29$^o$ (Fig. 3) of cam member 29$^k$ varies in a uniform gradient from a low point 29$^p$ to a high point 29$^q$; and as shown in Figs. 2 and 4 the downwardly projecting lug 29$^h$ on drive lever 29$^g$ is located near the extreme low portion 29$^p$ of said cam surface. The arrangement is such that upon counter-clockwise rotation of control knob 29$^l$, and just prior to engagement of lug 29$^h$ of drive lever 29$^g$ with the stop edge 29$^r$, formed integrally with top plate 29, said lug 29$^h$ will engage the aforementioned trigger lug 11$^d$ of lever 11$^a$ to throw the right-hand end of the latter downwardly into engagement with base plate 13, which serves as a limit stop therefor. Thus the right-hand ends of tension springs 31 (Figs. 1, 2 and 3) will be thrown below the line of pivotal support of upper lever 11$^e$, and as a consequence the forward end portion of lever 11$^e$ snaps downwardly to effect disengagement of contactor 18 from contacts 16, 16, to interrupt the motor circuit and stop the operation of the refrigerating system.

Referring more particularly to the diagrammatic illustration of the control device in Fig. 3; it may be assumed that control knob 29$^l$ has been rotated from the "off" position thereof (in which lug 29$^h$ was engaged with lug 11$^d$ on lever 11$^a$) to a position wherein a predetermined degree of cooling will be provided by operation of the evaporator driven by the controlled motor (neither of which is shown). Then, if the degree of cooling by the evaporator exceeds the preselected value, the diaphragm 12$^a$ will move downwardly, thus permitting corresponding downward movement of the combined cup and yoke member 23 (by the action of loading spring 22). This will result in the right-hand ends of coiled tension springs 31 moving below the line of pivotal support of lever 11$^e$; and as a consequence the left-hand end of lever 11$^e$ will snap downwardly to cause clockwise pivotal movement of the pair of levers 17, 17 (see Fig. 1), thus interrupting the controlled circuit. Thereafter, due to inoperation of the evaporator, the diaphragm will eventually move upwardly (with consequent upward movement of member 23, against the bias of loading spring 22) until the right-hand ends of springs 31, 31 are carried upwardly beyond the line of pivotal support of lever 11$^e$; whereupon the latter is snapped upwardly to the position illustrated in Fig. 3, to initiate another cycle of operation of the evaporator by closure of the controlled circuit.

As will be understood the median temperature of the refrigeration area will depend upon the fixed factory adjustment of the degree of loading of diaphragm 12$^a$, so that the controlled motor driving the evaporator will always be "cut-in" or started at the same degree of warmth in the refrigerator cabinet; whereas the "cut-out" control value may be varied through a relatively wide range by manual adjustment of knob 29$^l$. This novel arrangement of parts provides for insurance that the desired higher temperature will be attained after each cycle of operation of the evaporator for cooling.

The primary purpose of the aforementioned torque washer 29$^e$ is to afford the necessary resistance to turning of manually operable knob 29$^l$ and the parts attached thereto upon upward movement of diaphragm 12$^a$, as incident to an increase in pressure in the power element, with a consequent tendency of portion 11$^d$ of lever 11$^a$ to effect clockwise movement of lug 29$^h$ of drive lever 29$^g$ (see Fig. 3). This insures that the control switch will be maintained in "off" position regardless of the conditions in the system.

I claim:

1. In a circuit controlling device, in combination, a housing comprising a top plate and a base plate and a substantially U-shaped housing member positioned edgewise between said plates to provide an opening at one end of said housing, a control switch including an insulating contact carrying base mounted within said open end of the housing, a pressure responsive device mounted upon said base plate and having a loading spring associated therewith located within said housing, said loading spring having a fixed adjustment thereof to insure a constant cut-in characteristic of said controlling device, a snap operating mechanism for said switch mounted within said housing and normally operable to cause opening and closure of said switch as an incident to predetermined degrees of inward and outward movement of said pressure responsive device, means including a spring-biased pivoted lever operatively associated with said snap operating mechanism, said lever having a cam follower formed thereon, a cam member rotatably supported by said top plate and continuously engaged with said cam follower, and said cam member having a manually operable member associated therewith and located exteriorly of said top plate, said manually operable member providing for selection at will of the cut-out characteristic of said controlling device.

2. In a circuit controlling device, in combination, a housing comprising a top plate and a base plate and a substantially U-shaped housing member positioned edgewise between said plates to provide an opening at one end of said housing, a control switch including an insulating contact carrying base mounted within said open end of the housing, a pressure responsive device mounted upon said base plate and having a loading spring associated therewith located within said housing, said loading spring having a fixed adjustment thereof to insure a constant cut-in characteristic of said controlling device, a snap operating mechanism for said switch mounted within said housing and normally operable to cause opening and closure of said switch as an incident to predetermined degrees of inward and outward movement of said pressure responsive device, means including a spring-biased pivoted lever operatively associated with said snap operating mechanism, said lever having a cam follower formed thereon, a cam member rotatably supported by said top plate and continuously engaged with said cam follower, said cam member having a manually operable member associated therewith and located exteriorly of said top plate, said manually operable member providing for selection at will of the cut-out characteristic of said controlling device, and said manually operable member having associated means cooperable with said snap operating mechanism to insure maintenance of said switch in "off" position regardless of the condition of said pressure responsive device.

3. In a circuit controlling device, in combination, a housing open at one end and comprising a top plate, a base plate and a U-shaped housing member interposed edgewise between said plates, a control switch having a contact carrying insulating base mounted within the open end of said housing, a pressure responsive device mounted upon said base plate and having an associated loading spring located within said housing, said loading spring being interposed between a fixed abutment and a combined cup and saddle member engaged with said pressure responsive device, a plural lever snap operating mechanism for said switch mounted within said housing and operable by said pressure responsive device to effect opening and closure of said control switch under predetermined low and high pressure conditions, respectively, in said pressure responsive device, said pressure responsive device and said combined cup and saddle member coacting with said snap operating mechanism to insure closure of said switch at a predetermined constant point in the expansion of said pressure responsive device, associated means also cooperable with said snap operating mechanism to provide for opening of said switch at any one of a multiplicity of different points in the degree of contraction of said pressure responsive device, said last mentioned means including a pivoted lever normally spring biased in a direction to effect engagement thereof with an externally operable cam member cooperable with said pivoted lever to provide for variation of the setting of said snap operating mechanism for response thereof to open said switch as an incident to a preselected degree of contraction of said pressure responsive device.

4. In a circuit controlling device, in combination, a housing open at one end and comprising a top plate, a base plate and a U-shaped housing member interposed edgewise between said plates, a control switch having a contact carrying insulating base mounted within the open end of said housing, a pressure responsive device mounted upon said base plate and having an associated loading spring located within said housing, said loading spring being interposed between a fixed abutment and a combined cup and saddle member engaged with said pressure responsive device, a plural lever snap operating mechanism for said switch mounted within said housing and operable by said pressure responsive device to effect opening and closure of said control switch under predetermined low and high pressure conditions, respectively, in said pressure responsive device, said pressure responsive device and said combined cup and saddle member coacting with said snap operating mechanism to insure closure of said switch at a predetermined constant point in the expansion of said pressure responsive device, associated means also cooperable with said snap operating mechanism to provide for opening of said switch at any one of a multiplicity of different points in the degree of contraction of said pressure responsive device, said last mentioned means including a pivoted lever normally spring biased in a direction to effect engagement thereof with an externally operable cam member cooperable with said pivoted lever to provide for variation of the setting of said snap operating mechanism for response thereof to open said switch as an incident to a pre-selected degree of contraction of said pressure responsive device, and said externally operable means including a lug member movable therewith for engagement with a part of said snap operating mechanism to effect opening of said switch at will regardless of the condition of said pressure responsive device.

5. In a circuit controlling device, in combination, a housing open at one end and comprising a top plate, a base plate and a U-shaped housing member interposed edgewise between said plates, a control switch having a contact carrying insulating base mounted within the open end of said housing, a pressure responsive device mounted upon said base plate and having an associated loading spring located within said housing, said loading spring being interposed between a fixed abutment and a combined cup and saddle member engaged with said pressure responsive device, a plural lever snap operating mechanism for said switch mounted within said housing and operable by said pressure responsive device to effect opening and closure of said control switch under predetermined low and high pressure conditions, respectively, in said pressure responsive device, said pressure responsive device and said combined cup and saddle member co-acting with said snap operating mechanism to insure closure of said switch at a predetermined constant point in the expansion of said pressure responsive device, associated means including an externally located manually adjustable knob also cooperable with said snap operating mechanism to provide for opening of said switch at any one of a multiplicity of different points in the degree of contraction of said pressure responsive device, said last mentioned means including a pivoted lever normally spring biased in a direction to effect engagement thereof with a cam member attached to said manually adjustable knob and cooperable with said pivoted lever to provide for variation of the setting of said snap operating mechanism for response thereof to open said switch as an incident to a preselected degree of contraction of said pressure responsive device, a lug member positively movable with said manually adjustable knob for engagement with a part of said snap operating mechanism to effect opening of said switch at will regardless of the condition of said pressure responsive device, and means associated with said manually adjustable knob to frictionally retain the same in any adjusted position thereof.

References Cited in the file of this patent

UNITED STATES PATENTS 2,375,387     Robbins _____ May 8, 1945